United States Patent [19]
Takimoto et al.

[11] Patent Number: 5,861,732
[45] Date of Patent: Jan. 19, 1999

[54] BATTERY CHARGING APPARATUS

[75] Inventors: Hiroyuki Takimoto, Kanagawa-ken; Kazumitsu Tobe, Chiba-ken; Takayuki Saeki, Kanagawa-ken; Isao Harigaya, Kanagawa-ken; Koji Takahashi, Kanagawa-ken, all of Japan

[73] Assignee: Canon Kabushiki Kaisha, Tokyo, Japan

[21] Appl. No.: 947,713

[22] Filed: Oct. 9, 1997

Related U.S. Application Data

[63] Continuation of Ser. No. 706,352, Aug. 30, 1996, abandoned, which is a continuation of Ser. No. 400,490, Mar. 8, 1995, abandoned, which is a continuation of Ser. No. 308,825, Sep. 19, 1994, abandoned, which is a continuation of Ser. No. 625,459, Dec. 11, 1990, abandoned.

[30]      Foreign Application Priority Data

Dec. 11, 1989  [JP]  Japan .................................. 1-320838
Dec. 11, 1989  [JP]  Japan .................................. 1-320839
Dec. 11, 1989  [JP]  Japan .................................. 1-320840
Dec. 11, 1989  [JP]  Japan .................................. 1-320841

[51] Int. Cl.$^6$ ............................ H02J 7/00; G01N 27/416
[52] U.S. Cl. ........................ 320/132; 320/134; 320/136; 320/128; 320/DIG. 21; 324/427; 324/435
[58] Field of Search .................................... 320/133, 134, 320/135, 136, 128, 130, 132, DIG. 21, DIG. 18; 324/426, 427, 430, 433, 434, 435; 340/636

[56]           References Cited

U.S. PATENT DOCUMENTS

| | | | |
|---|---|---|---|
| 2,432,068 | 2/1947 | Pugh | 324/427 |
| 4,180,770 | 12/1979 | Eby | 320/136 |
| 4,377,787 | 3/1983 | Kikuoka et al. | 324/427 |
| 4,553,081 | 11/1985 | Koenck | 320/131 |
| 4,573,126 | 2/1986 | Lefebvre et al. | 324/426 |
| 5,119,011 | 6/1992 | Lambert | 320/136 |
| 5,130,659 | 7/1992 | Sloan | 320/136 |
| 5,151,865 | 9/1992 | Blessing et al. | 324/427 |
| 5,394,089 | 2/1995 | Clegg | 324/427 |

*Primary Examiner*—Peter S. Wong
*Assistant Examiner*—K. Shin
*Attorney, Agent, or Firm*—Robin, Blecker & Daley

[57]           ABSTRACT

A charging apparatus for charging a secondary battery arranged in such a manner that the interterminal voltage of the battery, which is being charged, is measured so that the charging status of the battery is detected in accordance with the measured interterminal voltage of the battery which is being charged and the charging/discharging characteristics with respect to the interterminal voltage of the battery. As a result, the charging status of the battery can accurately be detected.

28 Claims, 9 Drawing Sheets

BATTERY CHARGING APPARATUS

This application is a continuation of application Ser. No. 08/706,352, filed Aug. 30, 1996, abandoned, which is a continuation of Ser. No. 08/400,490 filed Mar. 8, 1995, abandoned, which is a continuation of Ser. No. 08/308,825, filed Sep. 19, 1994, abandoned, which is a continuation of Ser. No. 07/625,459, filed Dec. 11, 1990, abandoned.

BACKGROUND OF THE INVENTION

1. Field of the Invention

This invention relates to a charging apparatus for charging a secondary battery.

2. Description of the Related Art

A conventional charging apparatus comprises a display means for informing a user of the fact that the charging of the secondary battery has been completed. Usually, the information system is arranged in such a manner that the terminal voltage of the secondary battery to be charged is observed and a determination is made such that the charging of the secondary battery has been completed when the terminal voltage of the secondary battery to be charged has been raised to a predetermined level. In accordance with the determination made as described above, the display means is caused to display a predetermined information.

However, the conventional charging apparatus has not been able to inform the user of the specific time taken to completely charge the battery during the charging operation. Furthermore, the time, in which the apparatus loaded with the battery which has not completely been charged can be used, cannot be informed to the user. In addition, the degree of the charging of the battery which has not been completely charged cannot also be informed to the user.

SUMMARY OF THE INVENTION

An object of the present invention is to provide a charging apparatus capable of overcoming the above-described problems.

Another object of the present invention is to provide a charging apparatus capable of detecting the charging status of the battery.

In order to achieve the above-described objects, an aspect of the present invention lies in a charging apparatus for charging a secondary battery comprising:

measuring means for measuring the terminal voltage of the battery which is being charged; and detection means for detecting the charging status of the battery in accordance with the terminal voltage of the battery measured by the measuring means and the charging/discharging characteristics with respect to the terminal voltage of the battery, the terminal voltage being the voltage of the battery which is being charged.

Another object of the present invention is to provide a charging apparatus capable of accurately detecting the charging status of the battery regardless of the scattering of the characteristics of the batteries.

In order to achieve the above-described object, an aspect of the present invention lies in a charging apparatus for charging a secondary battery comprising:

open-circuit voltage measuring means for measuring the open-circuit voltage of a battery which is being charged; and detection means for detecting the charging/discharging status of the battery in accordance with the open-circuit voltage measured by the open-circuit voltage measuring means and the charging/discharging characteristics with respect to the open-circuit voltage of the battery.

Another object of the present invention is to provide a charging apparatus capable of detecting the charging status of the battery without performing a special operation.

In order to achieve the above-described object, an aspect of the present invention lies in a charging apparatus for charging a secondary battery comprising:

electromotive force measuring means for measuring the electromotive force of a battery which is being charged; and detection means for detecting the charging status of the battery in accordance with the electromotive force measured by the electromotive force measuring means and the charging/discharging characteristics with respect to the electromotive force of the battery.

Other and further objects, features and advantages of the invention will appear more fully from the following description.

DETAILED DESCRIPTION OF THE PREFERRED EMBODIMENTS

Preferred embodiments of the present invention will now be described.

First, a first embodiment of the present invention will be described with reference to the drawings.

Figure 1:
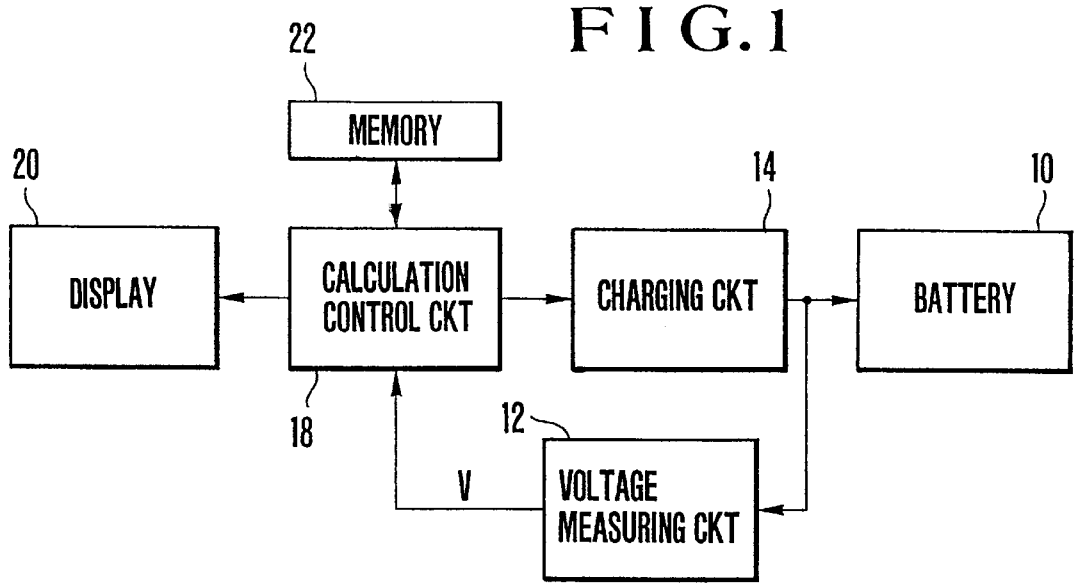
FIG. 1 is a block diagram which illustrates the structure of a first embodiment of a charging apparatus according to the present invention.

FIG. 1 is a block diagram which illustrates the structure of a first embodiment of a charging apparatus according to the present invention. Referring to FIG. 1, reference numeral 10 represents a battery to be charged, and 12 represents a voltage measuring circuit for measuring the terminal voltage of the battery 10. Reference numeral 14 represents a charging circuit for generating a predetermined charging current for charging the battery 10. Reference numeral 18 represents a calculation control circuit comprising a microcomputer for controlling the operation of the charging circuit 14 and said circulation control circuit for obtaining the degree of the charging of the battery 10 in accordance with the output of the voltage measuring circuit 12. Reference numeral 20 represents a display for displaying the result of the calculation performed by the calculation control circuit 18 and the state of the control. Reference numeral 22 represents a memory for storing characteristics data of the battery 10 such as the charging/discharging characteristics.

The voltage measuring circuit 12 measures the terminal voltage of the battery 10 when the charging circuit 14 is charging the battery 10 so as to transmit the result of the measurement to the calculation control circuit 18. The calculation control circuit 18 collates the result of the measurement of the voltage with data about the charging/discharging characteristics of the battery 10 stored in the memory 22 so that the degree of charging or the like is determined. The calculation control circuit 18 then causes the display 20 to display the result of the determination thus made.

Figure 2:
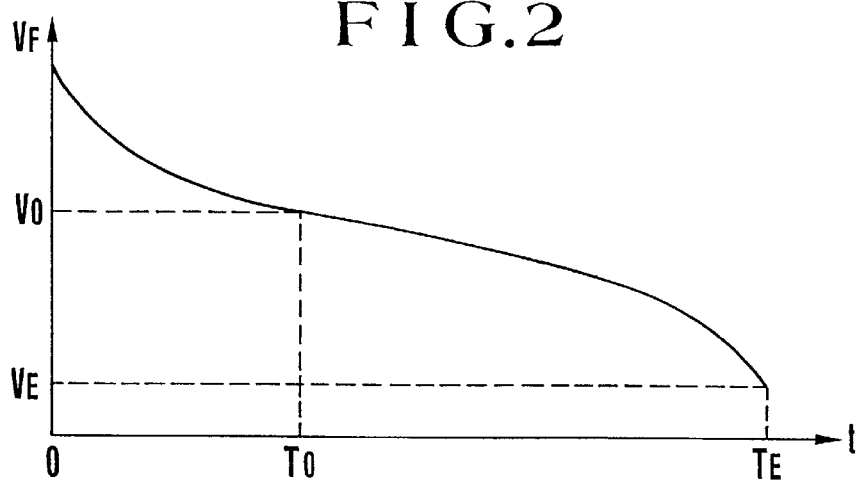
FIG. 2 is a graph which illustrates the discharging characteristics displayed when a predetermined load is connected to an Ni-Cd secondary battery.
Figure 3:
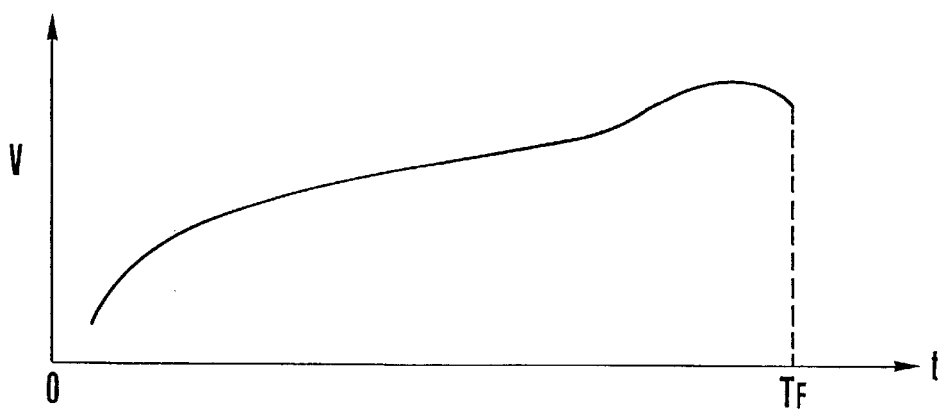
FIG. 3 is a graph which illustrates the charging characteristics displayed when the Ni-Cd secondary battery is charged with a predetermined electric current.

FIG. 2 is a graph which illustrates the discharging characteristics displayed when a predetermined load is connected to an Ni-Cd secondary battery, wherein the axis of ordinate stands for the terminal voltage of the battery and the axis of abscissa stands for the elapsed time. As can be seen from FIG. 2, the terminal voltage is monotonously lowered in accordance with a lapse of time. Referring to FIG. 2, symbol $T_E$ denotes the time in which the battery, which has been completely charged, can be used. FIG. 3 is a graph which illustrates the charging characteristics displayed when the Ni-Cd secondary battery is charged with a predetermined electric current, wherein the axis of ordinate stands for the terminal voltage of the battery and the axis of abscissa stands for the time. As shown in FIG. 3, the terminal voltage of the battery is slightly lowered when the battery has been completely charged. Therefore, whether or not the battery has been completely charged can be determined by detecting the fact that the terminal voltage of the battery has been lowered. Symbol $T_F$ denotes the time necessary to completely charge the battery 10 which has been completely discharged assuming that the symbol $V_E$ denotes the lowest terminal voltage capable of operating the subject apparatus.

Table 1 shows data of the discharging characteristics shown in FIG. 2 and data of the charging characteristics shown in FIG. 3, the table 1 being stored in the memory 22. Referring to Table 1, item A numerically shows the degree of charging in a range from 100 to 0, B shows time 0 to $T_F$ taken to completely charge the battery and C shows time $T_E$ to 0 taken to completely discharge the battery. Assuming that the terminal voltage of a battery which has been used to a certain degree is $V_O$, the time in which the battery can be used becomes, from FIG. 2, $T_E-T_O$ (minute) which is, as $C_O$, then stored in variable C of the memory 22. At this time, an assumption can be made that the battery has been used by $T_O/T_E \times 100$ (%) which is, as $A_O$, then stored in variable A of the memory 22. Furthermore, an estimation can be made that the battery can be completely charged in $T_F \times T_O/T_E$ (minute), which is, as $B_O$, then stored in variable B of the memory 22.

TABLE 1

| terminal Voltage | A | B | C |
|---|---|---|---|
| $V_F$ | 100 | 0 | $T_E$ |
| . | . | . | . |
| . | . | . | . |
| . | . | . | . |
| $V_O$ | $A_O$ | $B_O$ | $C_O$ |
| . | . | . | . |
| . | . | . | . |
| . | . | . | . |
| 0 | 0 | $T_F$ | 0 |

Figure 4:
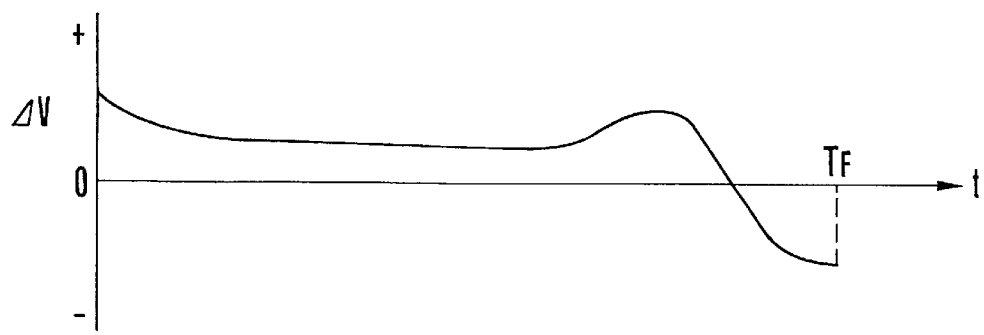
FIG. 4 is a graph which illustrates the time sequential change in the charging characteristics shown in FIG. 3.

FIG. 4 is a graph which illustrates the time sequential change in the charging characteristics shown in FIG. 3. The degree of the charging can further accurately be determined by observing the characteristics about the change in the terminal voltage shown in FIG. 4 as well as the charging characteristics shown in FIG. 3.

Figure 5:
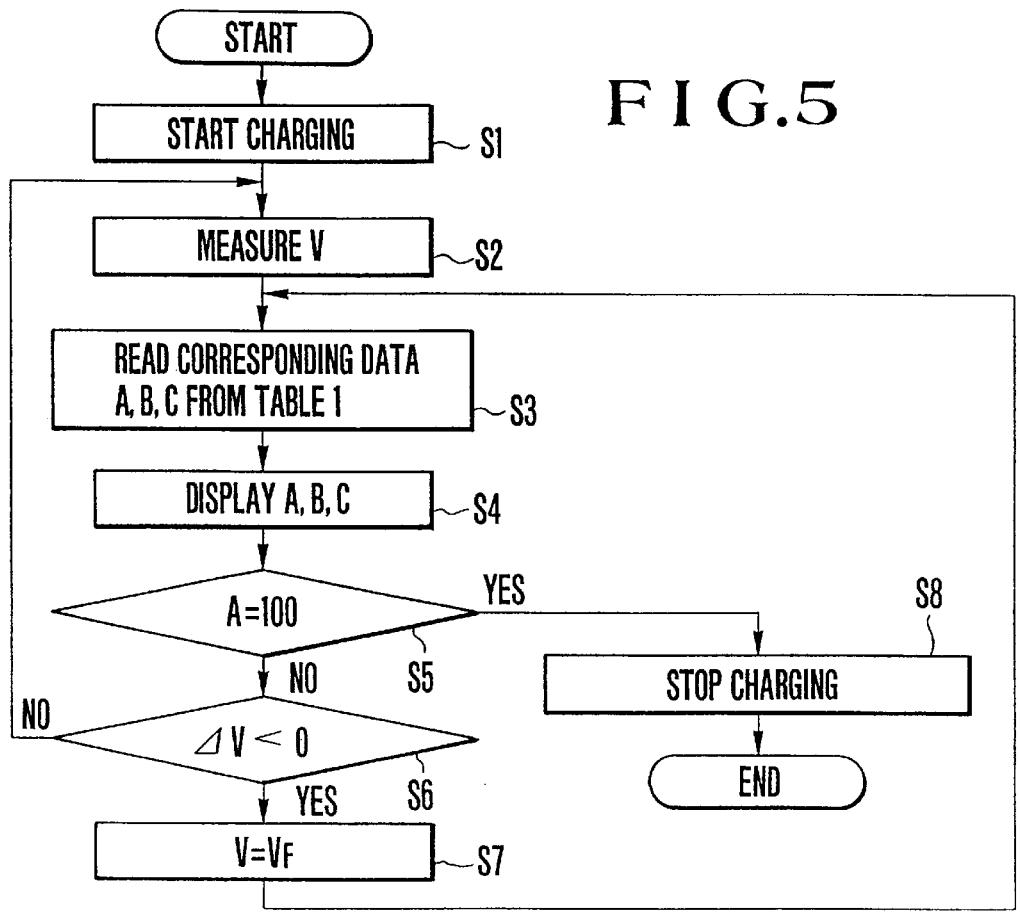
FIG. 5 is an operation flow chart of the calculation control circuit 18 shown in FIG. 1.

FIG. 5 is an operation flow chart of the calculation control circuit 18 shown in FIG. 1. First, the calculation control circuit 18 first actuates the charging circuit 14 so as to start the charging (S1). Then, the terminal voltage V of the battery 10, which is being charged, is measured by the voltage measuring circuit 12 (S2). The measured terminal voltage V is collated with data shown in Table 1 stored in the memory 22 so that the corresponding data A, B and C in Table 1 are read (S3). The thus-read data is transferred to the display 20 so as to be displayed (S4).

Since the battery 10 has not been completely charged in a case where the value of data A is less than 100 (S5), the charging circuit 14 is caused to continue the charging operation. Since the battery 10 has been completely charged in a case where the terminal voltage is lowered (S6), the battery 10 has been completely charged. Therefore, in order to stop the charging, variable V stored in the memory 22 as the terminal voltage is rewritten to the terminal voltage $V_F$ for the time of the complete charge before the flow returns to step S3 (S7) in which data A expressing "100" is read from the memory 22. In a case where the value of data A is equal to "100", the battery 10 has been completely charged. Therefore, the operation of the charging circuit 14 is stopped (S8) and the charging operation is ended.

As described above, according to this embodiment, the degree of charging of the battery, the time required to fully charge the battery and the time in which the battery can be used can quantitatively be known.

Then, a second embodiment of the present invention will be described with reference to the drawings.

Figure 6:
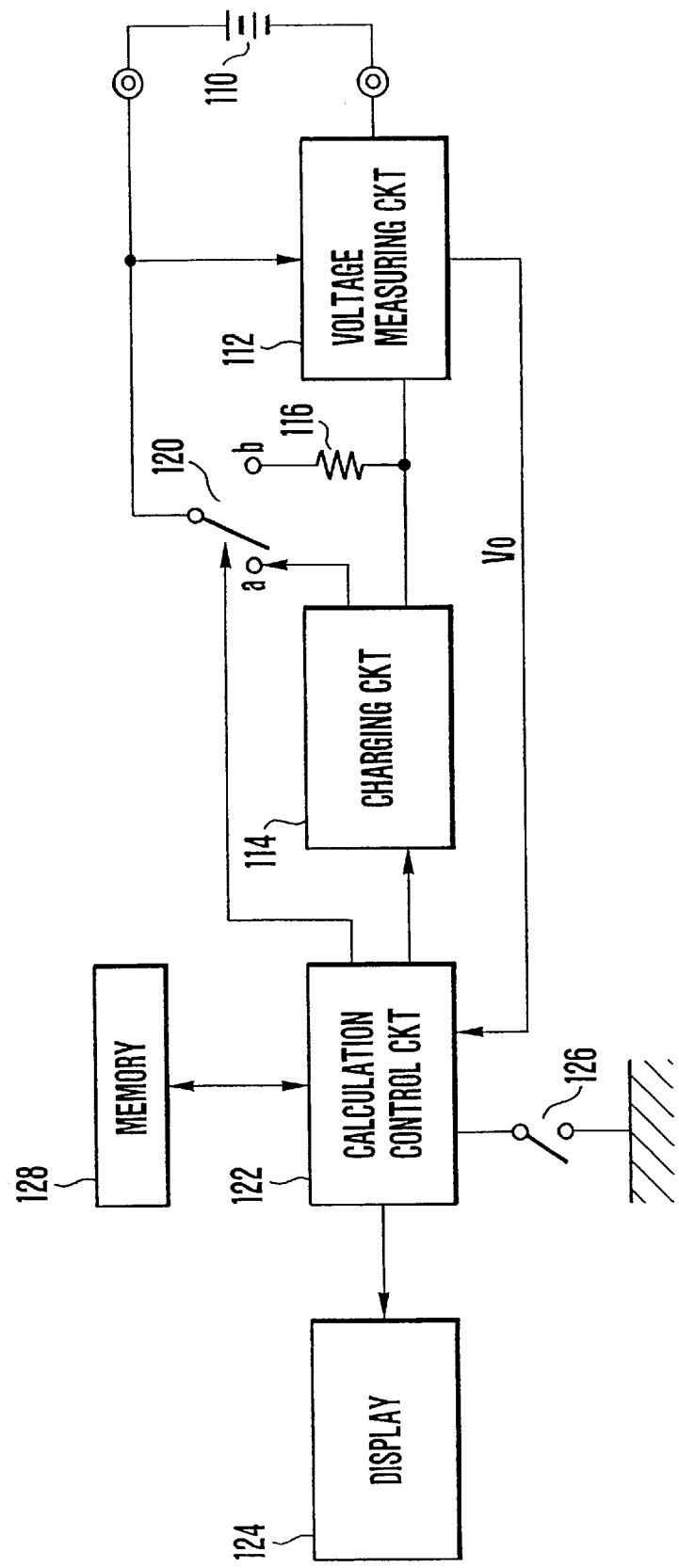
FIG. 6 is a block diagram which illustrates the structure of a second embodiment of the charging apparatus according to the present invention.

FIG. 6 is a block diagram which illustrates the structure of the second embodiment of the charging apparatus according to the present invention. Referring to FIG. 6, reference numeral 110 represents a battery to be charged and 112 represents a voltage measuring circuit for measuring the terminal voltage of the battery 110. Reference numeral 114 represents a charging circuit for charging the battery 110, and 116 represents a resistor for measuring the degree of charging of the battery 110. Reference numeral 120 represents a switch for selecting the charging circuit 114 or the resistor 116 so as to connect it to the battery 110 in order to select the charging with the charging circuit 114 or the discharging with the resistor 116. Reference numeral 122 represents a calculation control circuit comprising a microcomputer for controlling the operation of the charging circuit 114 and the switching action of the switch 120 and as well as obtaining the degree of the charging of the battery 110 in accordance with the output of the voltage measuring circuit 112. Reference numeral 124 represents a display for displaying the result of the calculation performed by the calculation control circuit 122 and the state of the control. Reference numeral 126 represents an instruction switch for instructing the calculation control circuit 122 to measure the degree of charging of the battery 110. Reference numeral 128 represents a memory for storing characteristics data such as charging/discharging characteristics of the battery 110 to be charged.

The calculation control circuit 122 brings the charging circuit 114 into an operation state and causes the switch 120 to be connected to contact "a" shown in the drawing when the battery 110 is charged. During the charging operation, the calculation control circuit 122 causes the switch 120 to be connected to contact "b" shown in the drawing for a considerably short time at a predetermined interval or in response to the action of the switch 126. As a result, the battery 110 is discharged through the resistor 116. Then, the terminal voltage of the battery 110 is measured by the voltage measuring circuit 122 after the transient phenomenon has been ended. The voltage level thus measured is supplied to the calculation control circuit 122.

The above-described discharging characteristics shown in FIG. 2 are, as the discharging characteristics in a case where, for example, the resistor 116 is connected to an Ni-Cd secondary battery, stored in the form of data items in the memory 128. Then, the terminal voltage of the battery 110 is measured when the resistor 116, which is the predetermined load, is connected. As a result, the degree of the charging of the battery which is being charged can be quantitatively obtained. That is, the calculation control circuit 122 collates the initial terminal voltage V displayed when the resistor 116 is connected to the battery 110 with the discharging characteristics (specifically, the discharging characteristics data stored in the memory 128) shown in FIG. 2 so that the degree of charging is determined.

The data shown in Table 1 is stored in the memory 128 similarly to the memory 22 according to the above-described first embodiment of the present invention. Referring to Table 1, item A numerically shows the degree of charging in a range from 100 to 0, B shows time 0 to $T_F$ taken to completely charge the battery and C shows time $T_E$ to 0 taken to show the lowest voltage $V_E$ at which the battery can be used. Assuming that the terminal voltage of a battery which has been used to a certain degree is $V_O$, the time in which the battery can be used becomes, from FIG. 2, $T_E-T_O$ (minute) which is, as $C_O$, then stored in variable C of the memory 128. At this time, an assumption can be made that the battery has been used by $T_O/T_E \times 100$ (%) which is, as $A_O$, then stored in variable A of the memory 128. Furthermore, an estimation can be made that the battery can be completely charged in $T_F \times T_O/T_E$ (minute), which is, as $B_O$, then store in variable B of the memory 128.

Figure 7:
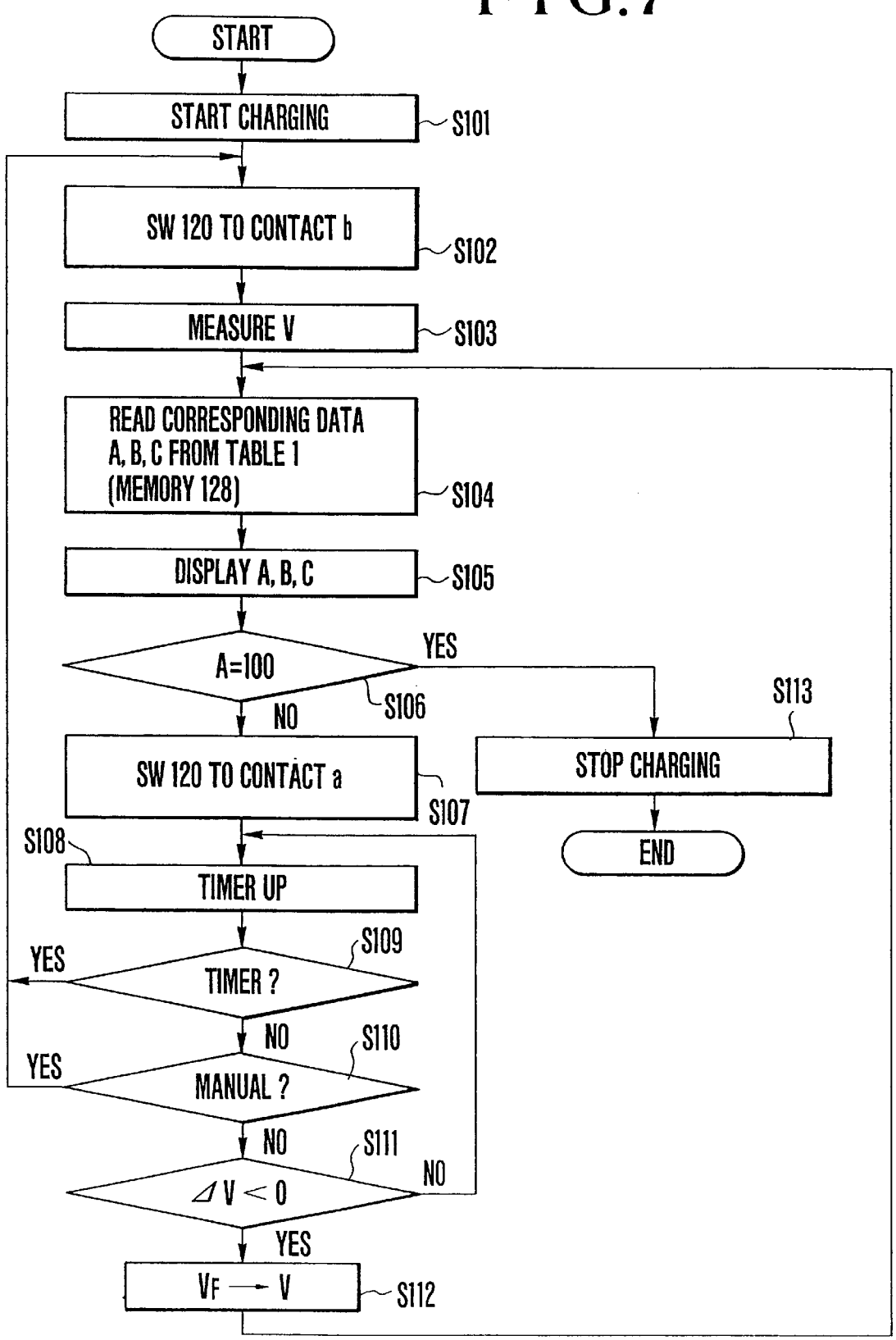
FIG. 7 is an operation flow chart of the calculation control circuit 122 shown in FIG. 6.

FIG. 7 is an operation flow chart of the calculation control circuit 122 shown in FIG. 6. The calculation control circuit 122 first operates the charging circuit 114 so that the charging operation is stared (S101). Then, the switch 120 is connected to the contact "b" as shown in the drawing (S102) and the terminal voltage $V_O$ of the battery 110 realized by the resistor 116 is measured by the voltage measuring circuit 112 (S103). The terminal voltage $V_O$ measured in step S103 is collated with data shown in Table 1 and stored in the memory 128. Then, the corresponding charge degree A, time B necessary to be taken to charge the battery and residual time C in which the battery can be used are read (S104). The thus-read data items are supplied to the display 124 so as to be displayed (S105). Since the battery 110 has not been completely charged in a case where the value of data A is less than "100", the switch 120 is connected to the contact "a" so that the battery is charged for a predetermined time set by a timer (omitted from illustration) (S107, S108 and S109). As an alternative to this, the flow returns to S110 and S102 in response to the action of the switch 126 so that the interterminal voltage is measured.

The terminal voltage of the battery 110 is also measured (S111) by the voltage measuring circuit 112 during the charging operation. If the interterminal voltage is not lowered, the flow returns to step S108 in which the charging operation is continued. If the same has been lowered (S111), the flow returns to step S104 (S112) in which the variable V is rewritten to the terminal voltage $V_F$ which is displayed at the time when the battery has been completely charged so that the data A showing "100" is read form the memory 128.

Since the battery 110 has been completely charged if the data A is, in step S106, equal to "100", the operation of the charging circuit 114 is stopped (S113) and the charging operation is stopped.

According to the above-described embodiments, the degree of the charging of the battery is quantitatively determined in accordance with the result of a collation made between the terminal voltage displayed When the predetermined load is connected. The degree of the charging can further accurately be determined when the structure is arranged in such a manner that the load is connected to the battery for a predetermined time and the change in the terminal voltage during the above-described connection is collated with the above-described discharging characteristics. Furthermore, another structure may be employed which is arranged in such a manner that the terminal voltage in a substantially no load state and the terminal voltage in a state where a predetermined load is connected are measured so as to determine the degree of the charging of the battery in accordance with the difference between the interterminal voltages.

As described above, according to this embodiment, the degree of charging of the battery, the time necessary to be taken to completely charge the battery and the time in which the battery can be used can quantitatively be known.

A third embodiment of the present invention will be described with reference to the drawings.

Figure 8:
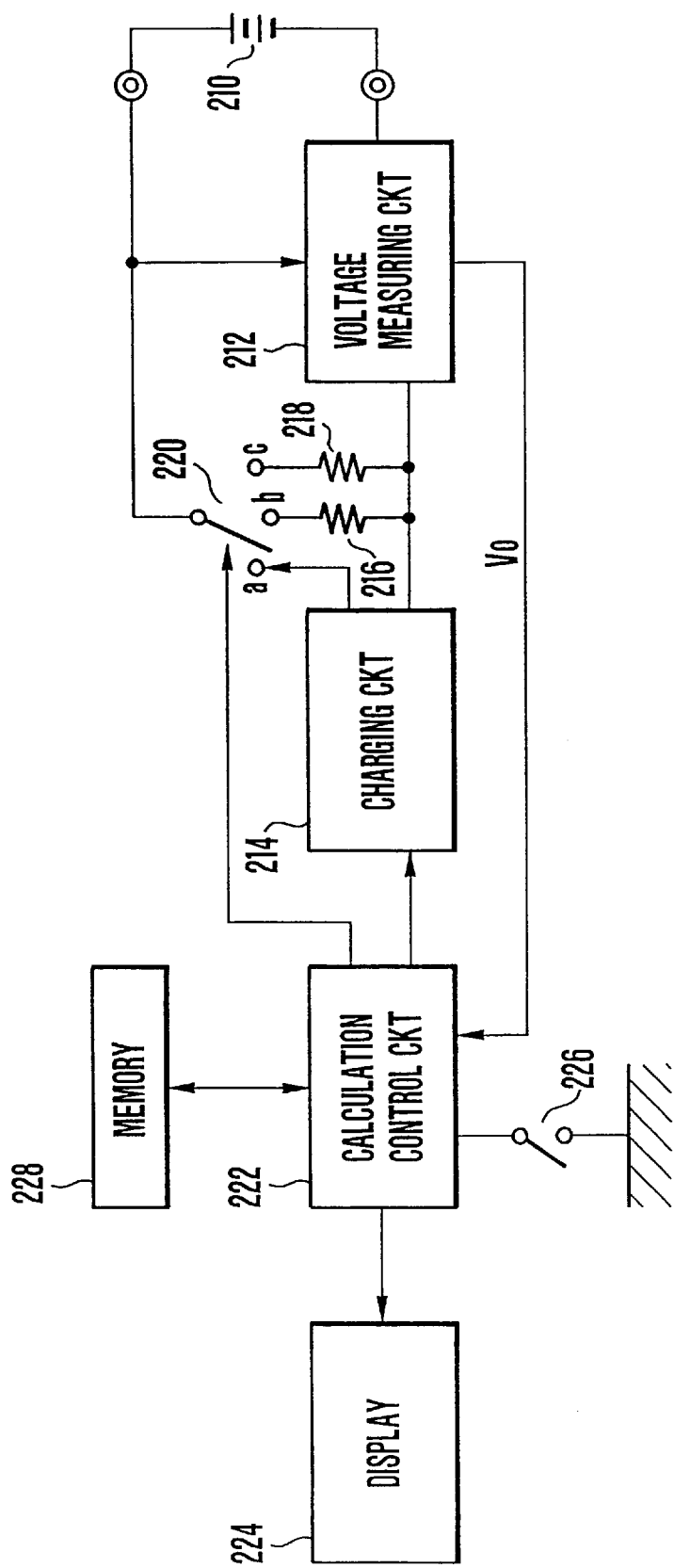
FIG. 8 is a block diagram which illustrates the structure of a third embodiment of the charging apparatus according to the present invention.

FIG. 8 is a block diagram which illustrates the structure of the third embodiment of the charging apparatus according to the present invention. Referring to FIG. 8, reference numeral 210 represents a battery to be charged and 212 represents a voltage measuring circuit for measuring the terminal voltage of the battery 210. Reference numeral 214 represents a charging circuit for charging the battery 210, and 216 and 218 represent resistors for measuring the degree of the charging of the battery 210. Reference numeral 220 represents a switch for selectively connecting the charging circuit 214, the resistor 216 or the resistor 218 to the battery 210 in order to select the charging with the charging circuit 214 or the discharging with the resistor 216 or the resistor 218. Reference numeral 222 represents a calculation control circuit comprising a microcomputer for controlling the operation of the charging circuit 214 and the switching action of the switch 220 and obtaining the degree of the charging of the battery 210 in accordance with the output of the voltage measuring circuit 212.

Reference numeral 224 represents a display for displaying the result of the calculation performed by the calculation control circuit 222 and the state of the control. Reference numeral 226 represents an instruction switch for instructing the calculation control circuit 222 to measure the degree of the charging of the battery 210. Reference numeral 228 represents a memory for storing the characteristics data such as the charging/discharging characteristics of the open-circuit voltage of the battery 210 to be charged or measured.

The calculation control circuit 222 causes the switch 220 to be connected to the contact "a" when the battery 210 is charged and operates the charging circuit 214. The terminal voltage of the battery, which is being charged, is measured by the voltage measuring circuit 212 by connecting the switch 220 to the contact "b" or "c" at a predetermined time interval, at a time interval which corresponds to the interterminal voltage of the battery 210, at an optional time interval, or in accordance with the action of the switch 226. The terminal voltage thus measured by the voltage measuring circuit 212 is supplied to the calculation control circuit 222.

The calculation control circuit 222 calculates electromotive force v of the battery 210 from terminal V1 displayed when the resistor 216 is connected to the battery 210 and terminal voltage V2 displayed when the resistor 218 is connected to the same. Since the resistance value of each of the resistors 216 and 218 is a known value, the following relationships can be obtained assuming that the electric currents are respectively I1 and I2, the internal resistance of the battery 210 is R and the electromotive force (open-circuit voltage) is v:

$$R = (V1 - V2)/(I2 - I1) \quad (1)$$
$$v = V1 + I1 \cdot R$$
$$= V2 + I2 \cdot R$$
$$= (I2 \cdot V1 - I1 \cdot V2)/(I2 - I1)$$

The electromotive force v is not influenced by external factors such as the internal resistance R and the resistances of the connecting leas wires. Therefore, the degree of charging/discharging of the battery 210 can accurately be determined by utilizing the electromotive force.

Table 2 shows data of the discharging characteristics shown in FIG. 2 and the charging characteristics shown in FIG. 3, the data shown in Table 2 being stored in the memory 228. Referring to Table 2, item A numerically shows the degree of charging in a range from 100 to 0, B shows time 0 to $T_F$ taken to completely charge the battery and C shows time $T_E$ to 0 taken to show the lowest voltage $V_E$ at which the battery can be used. Assuming that the terminal voltage of a battery which has been used to a certain degree is $V_O$, the time in which the battery can be used becomes, from FIG. 2, $T_E$-$T_O$ (minute) which is, as $C_O$, then stored in variable C of the memory 228. At this time, an assumption can be made that the battery has been used by $T_O/T_E \times 100$ (%) which is, as $A_O$, then stored in variable A of the memory 228. Furthermore, an estimation can be made that the battery can be completely charged in $T_F \times T_O/T_E$ (minute), which is, as $B_O$, then stored in variable B of the memory 128.

TABLE 2

| Electromotive force | A | B | C |
| --- | --- | --- | --- |
| $v_F$ | 100 | 0 | $T_E$ |
| . | . | . | . |
| . | . | . | . |
| . | . | . | . |
| $v_O$ | $A_O$ | $B_O$ | $C_O$ |
| . | . | . | . |

TABLE 2-continued

| Electromotive force | A | B | C |
| --- | --- | --- | --- |
| . | . | . | . |
| . | . | . | . |
| $v_E$ | 0 | $T_F$ | 0 |

Figure 9:
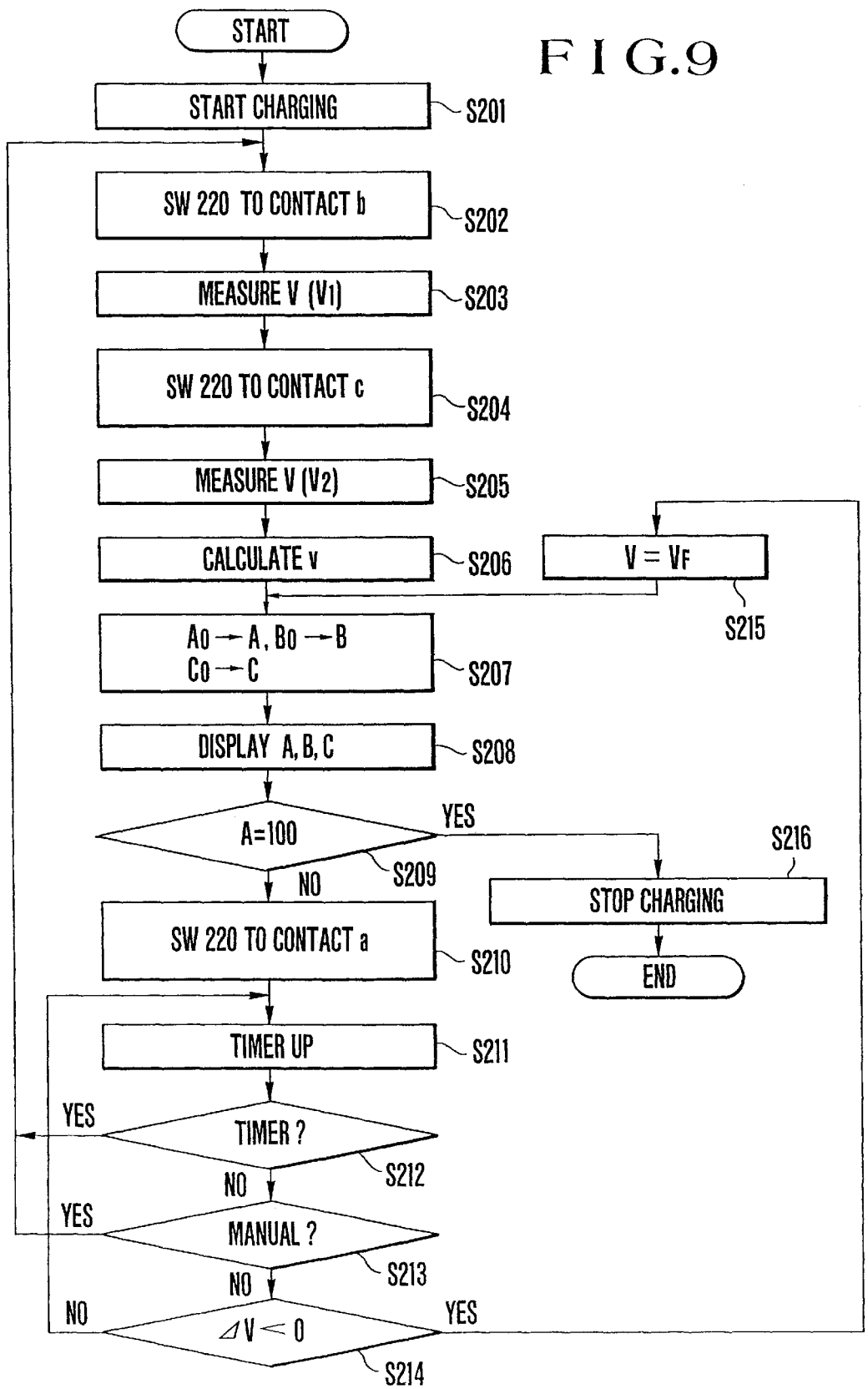
FIG. 9 is an operation flow chart of a calculation control circuit 222 shown in FIG. 8.

FIG. 9 is an operation flow chart of a calculation control circuit 222 shown in FIG. 8. The calculation control circuit 222 first operates the charging circuit 214 so that the charging operation is started (S1). Then, the switch 220 is connected to the contact "b" (S202) so that the terminal voltage V1 of the battery 210 due to the resistor 216 is measured by the voltage measuring circuit 212 (S203). Then, the switch 220 is connected to the contact "c" (S204) so that the interterminal voltage V1 of the battery 210 due to the resistor 218 is measured by the voltage measuring circuit 212 (S205). The voltages V1 and V2 measured in steps S203 and 205 and their electric currents I1 and I2 are substituted into Equation (1) so that the electromotive force v of the battery 210 is calculated (S206). The obtained electromotive force v is collated with data table 2 stored in the memory 228 so that the corresponding data A, B and C shown in Table 2 are read (S207). The thus-read data is transferred to the display 224 so that the data is displayed (S208). Since the battery 210 has not been completely charged if the value of the data A is less than "100" (S209), the switch 220 is connected to the contact "a" (S210), so that the battery 210 is charged for a predetermined time set by a timer (omitted from illustration) (S211 and S212). As an alternative to this, the flow returns to step S202 in response to the action of the switch 226 so that the terminal voltage is measured. If the terminal voltage of the battery 210 has been lowered (S214), the electromotive force v stored in the memory 228 is rewritten to the electromotive force $v_F$ for the completely charged state before the flow returns to step S207 (S215). In step S207, data A expressing "100" is read from the memory 228.

Since the battery 210 has been completely charged if the data A is equal to "100" in step S209, the operation of the charging circuit 214 is stopped (S216) and the charging operation is ended.

According to the above-described embodiment, the charging/discharging degree is estimated in accordance with the electromotive force of the battery. It may, of course, be estimated in accordance with the terminal voltage. In a case where it is estimated in accordance with the terminal voltage, the accuracy is deteriorated to a certain degree in comparison to the accuracy obtained at the time when the electromotive force is utilized. However, the operation of the calculation control circuit 222 can be simplified. Furthermore, another structure may be employed in which the two resistance values may be obtained by realizing a partial short circuit of one resistor as an alternative to the above-described structure in which the two resistors 216 and 218 are switched.

As described above, according to the present invention, the degree of charging/discharging of the battery, the time necessary to be taken to completely charge the battery and the time in which the battery can be used can accurately be known. Furthermore, since the degree of the charging is determined in accordance with the open-circuit voltage, the degree of the charging can be uniformed in a plurality of batteries.

Then, a fourth embodiment of the present invention will be described with reference to the drawings.

Figure 10:
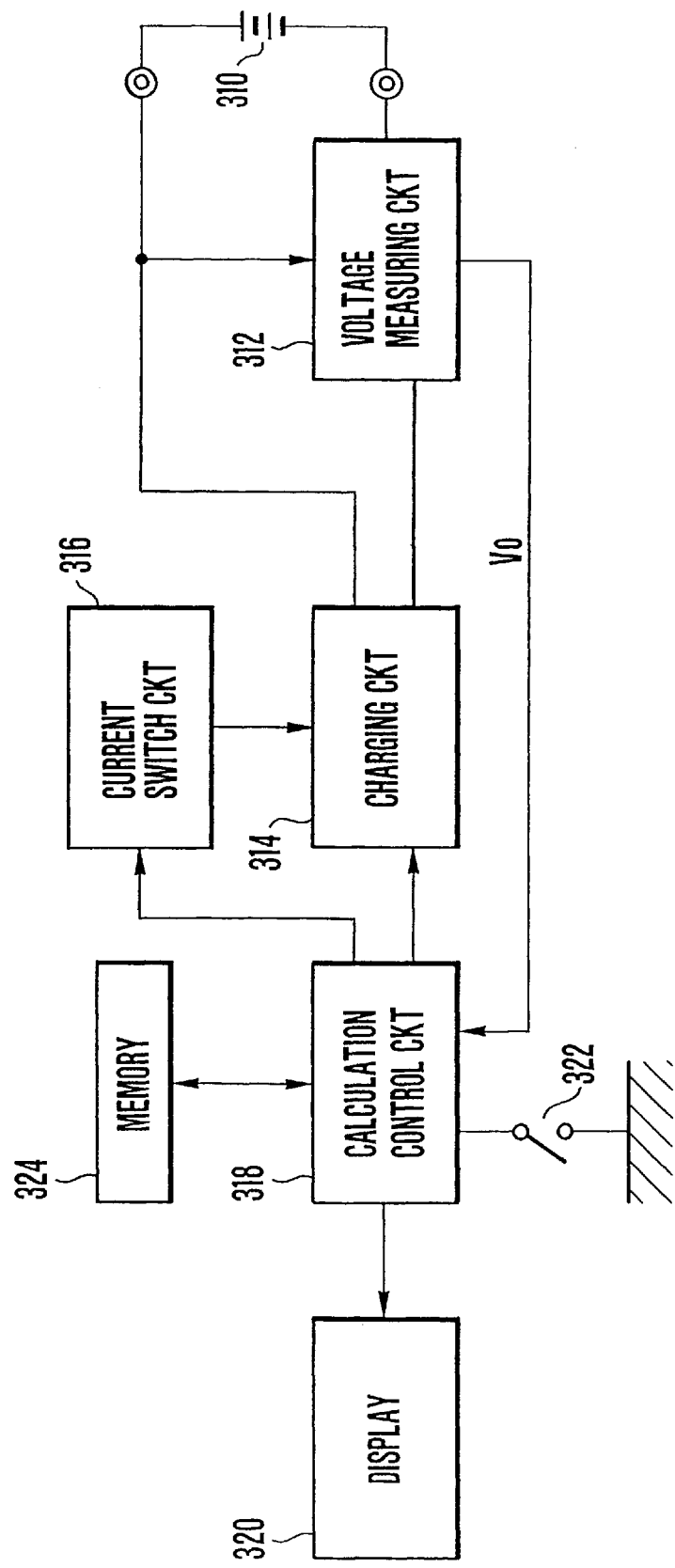
FIG. 10 is block diagram which illustrates the structure of a fourth embodiment of the charging apparatus according to the present invention.

FIG. 10 is a block diagram which illustrates the structure of the fourth embodiment of the charging apparatus according to the present invention. Referring to FIG. 10, reference numeral 310 represents a battery to be charged and 312 represents a voltage measuring circuit for measuring the terminal voltage of the battery 310. Reference numeral 314 represents a charging circuit capable of generating at least two or more types of charging currents for charging the battery 310. Reference numeral 316 represents an electric current switch circuit for switching the charging current generated by the charging circuit 314. Reference numerals 318 represents a calculation control circuit comprising a microcomputer for controlling the operation of the charging circuit 314 and the selection of the charging current via the electric current switch circuit 316, the microcomputer further obtaining the degree of the charging of the battery 310 in accordance with the output of the voltage measuring circuit 312. Reference numeral 320 represents a display for displaying the result of the calculation performed by the calculation control circuit 318 and the state of the control. Reference numeral 322 represents an instruction switch for instructing the calculation control circuit 318 to measure the degree of the charging of the battery 310. Reference numeral 324 represents a memory for storing characteristics data such as the charging/discharging characteristics of the battery 310.

Figures 11A, 11B:
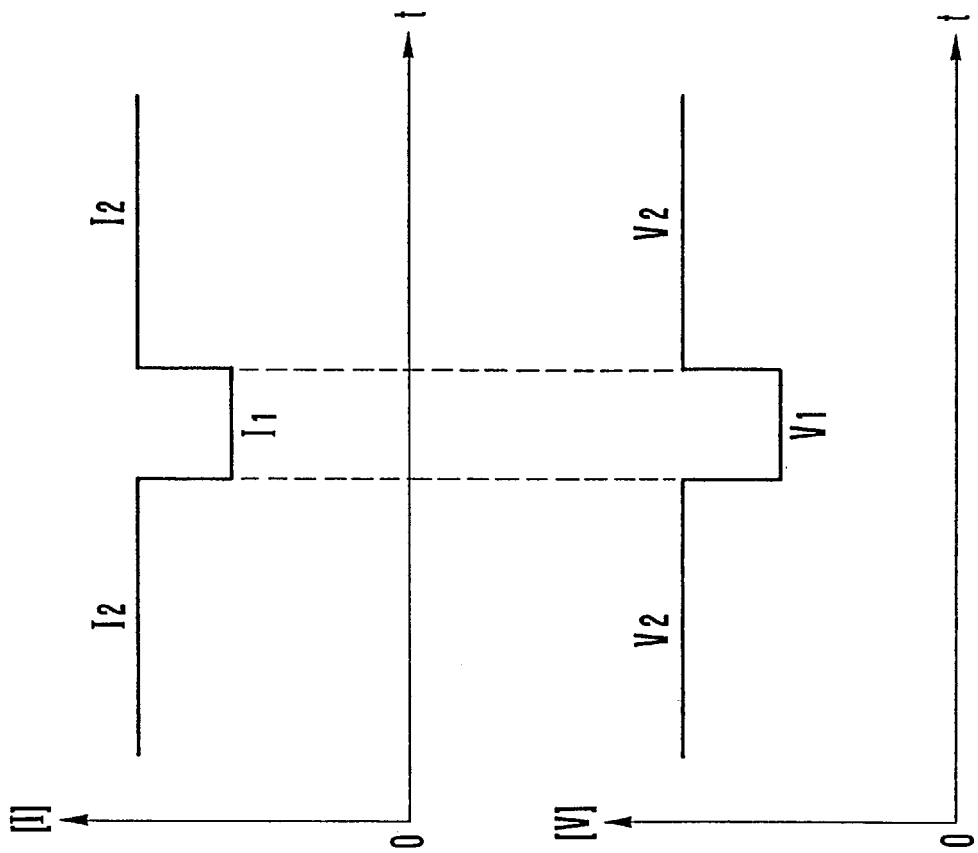
FIGS. 11(*a*) and 11(*b*) respectively illustrate the signal waveform of a charging current and the terminal voltage of a battery 310 shown in FIG. 10.

The calculation control circuit 322 controls the charging circuit 314 via the electric current switch circuit 316 so that the battery 310 is charged with two type charging currents $I_1$ and $I_2$ as shown in FIGS. 11($a$) and 11($b$). The terminal voltage of the battery 310 displayed when the above-described two electric currents $I_1$ and $I_2$ are used to charge the battery 310 is measured by the voltage measuring circuit 312. In accordance with the result of the measurement, the electromotive force (open-circuit voltage) of the battery 310 is calculated. That is, assuming that the internal resistance of the battery 310 is R, the electromotive force is v, the terminal voltage of the battery 310 when the charging current $I_1$ is used is $V_1$, and the terminal voltage of the battery 310 when the charging current $I_2$ is used is $V_2$, the following relationships are held:

$$\begin{aligned} R &= (V_1 - V_2)/(I_2 - I_1) \quad (2) \\ v &= V_1 + I_1 \cdot R \\ &= V_2 + I_2 \cdot R \\ &= (I_2 V_1 - I_1 V_2)/(I_2 - I_1) \end{aligned}$$

The electromotive force v is not influenced by external factors such as the internal resistance R and the resistances of the connecting lead wires. Therefore, the degree of charging/discharging of the battery 310 can accurately be determined by utilizing the electromotive force.

Table 2 shows data of the discharging characteristics shown in FIG. 2 and the charging characteristics shown in FIG. 3, the data shown in Table 2 being stored in the memory 324. Referring to Table 2, item A numerically shows the degree of charging in a range from 100 to 0, B shows time 0 to $T_F$ taken to completely charge the battery and C shows time $T_E$ to 0 taken to show the lowest voltage $V_E$ art which the battery can be used. Assuming that the terminal voltage of a battery which has been used to a certain degree is $V_O$, the time in which the battery can be used becomes, from FIG. 2, $T_E$-$T_O$ (minute) which is, as $C_O$ then stored in variable C of the memory 324. At this time, an assumption can be made that the battery has been used by $T_O/T_E \times 100$ (%) which is, as $A_O$, then stored in variable A of the memory 324. Furthermore, an estimation can be made that the battery can be completely charged in $T_F \times T_O/T_E$ (minute), which is, as $B_O$, then stored in variable B of the memory 324.

Figure 12:
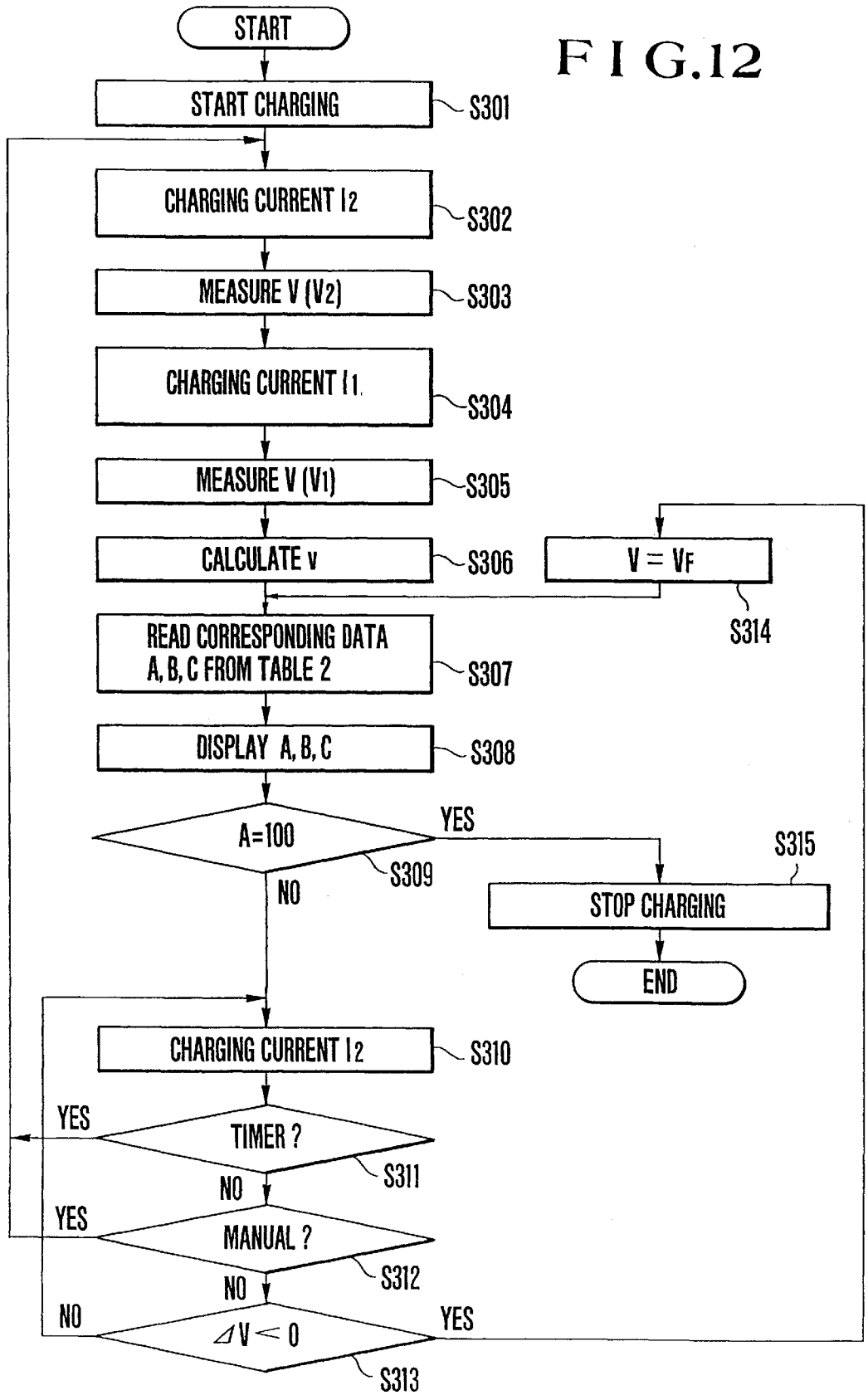
FIG. 12 is an operation flow chart of the calculation control circuit 318 shown in FIG. 10.

FIG. 12 is an operation flow chart of the calculation control circuit 318 shown in FIG. 10. The calculation control circuit 318 first operates the charging circuit 314 (S301) and the charging current $I_2$ is supplied to the battery 310 (S302). Then, the terminal voltage $V_2$ of the battery at this time is measured by the voltage measuring circuit 312 (S303). Then, the charging current $I_1$ is supplied to the charging circuit 314 for an extremely short time which is necessary to measure the voltage (S204). Then, the terminal voltage $V_1$ of the battery 310 at this time is measured (S305). The calculation control circuit 318 then substitutes the terminal voltage levels $V_1$ and $V_2$ measured with the charging currents $I_1$ and $I_2$ in steps S303 and S305 into the above-described equation, so that the electromotive force v of the battery 310 is calculated (S306). The obtained electromotive force v is collated with data shown in Table 2 stored in the memory 324. Then, the corresponding data items A, B and C of Table 2 are read (S307) so as to transmit them to the display 320, the display 320 displaying them (S308).

Since the battery 310 has not been completely charged if the value of the data A is less than "100", the charging of the battery 310 is continued while making the output of the charging circuit 314 to be the large charging current $I_2$ (S310), the charging being continued for a predetermined time set by a timer (omitted from illustration) (S311). As an alternative to this, the flow returns to step S302 in response to the action of the switch 322 so that the interterminal voltage is measured. If the interterminal voltage of the battery which is being charged is lowered (S313), the electromotive force v stored in the memory 324 is rewritten to the electromotive force $v_F$ for the completely charged state before the flow returns to step S307 (S314). Then, the data A expressing "100" is read from the memory 324.

Since the battery 310 has been completely charged if the value of the data A is equal to "100" in step S309, the operation of the charging circuit 314 is stopped (S315) and the charging operation is ended.

According to the above-described embodiment, the degree of charging/discharging is estimated in accordance with the electromotive force of the battery. It may, of course, be estimated in accordance with the terminal voltage.

In a case where it is estimated in accordance with the terminal voltage, the accuracy is deteriorated to a certain degree in comparison to the accuracy obtained at the time when the electromotive force is utilized. However, the operation of the calculation control circuit 318 can be simplified.

As described above, according to this embodiment, the degree of charging/discharging of the battery, factors of the status of the charging/discharging of the battery, such as the time necessary to be taken to completely charge the battery and the time in which the battery can be used can accurately be known.

Although the invention has been described in this preferred form with a certain degree of particularity, it is understood that the present disclosure of the preferred form has been changed in the details of construction, and the combination and arrangement of parts may be modified without departing from the spirit and the scope of the invention as hereinafter claimed.

What is claimed is:

1. An electric apparatus having a function to check a battery, comprising:

(a) said battery for supplying the power to said apparatus;

(b) measuring means for measuring a terminal voltage of said battery at a predetermined period in the course of battered charging;

(c) display means for displaying information corresponding to a usable time of said battery in accordance with the terminal voltage of said battery; and (d) display control means having a memory stored with a plurality of sets of control data each controlling a displaying state of said display means which state corresponds to the terminal voltage of said battery, for reading out a set of control data from among said plurality of sets of control data stored in said memory in accordance with the terminal voltage of said battery measured by said measuring means and for outputting said set of control data thus read out to said display means.

2. An electric apparatus according to claim 1, wherein said battery is a rechargeable secondary battery.

3. An electric apparatus according to claim 1, wherein said display means includes an analog/digital converter, which can put the measured terminal voltage of said battery into a data form.

4. An electric apparatus according to claim 1, wherein said measuring means is arranged to represent in numeral the usable time of said battery so as to be displayed on said display means.

5. An electric apparatus according to claim 4, wherein said memory stores a plurality of sets of data each being represented in numeral to be displayed on said display means, each having a correspondence to the terminal voltage of said battery.

6. An electric apparatus according to claim 1, wherein said measuring means is arranged to represent in length of a bar the usable time of said battery so as to be displayed on said display means.

7. An electric apparatus according to claim 6, wherein said memory stores a plurality of sets of data each being represented in length of a bar to be displayed on said display means, each having a correspondence to the terminal voltage of said battery.

8. An electric apparatus having a function to check a battery, comprising:

(a) said battery for supplying the power to said apparatus;

(b) measuring means for measuring an electromotive force of said battery at a predetermined period in the course of battery charging;

(c) display means for displaying information corresponding to a usable time of said battery in accordance with the electromotive force of said battery; and (d) display control means having a memory stored with a plurality of sets of control data each controlling a displaying state of said display means which state corresponds to the electromotive force of said battery, for reading out a set of control data from among said plurality of sets of control data stored in said memory in accordance with the electromotive force of said battery measured by said measuring means and for outputting said set of control data thus read out to said display means.

9. An electric apparatus according to claim 8, wherein said battery is a rechargeable secondary battery.

10. An electric apparatus according to claim 8, wherein said display means includes an analog/digital converter which can put the measured electromotive force of said battery into a data form.

11. An electric apparatus according to claim 8, wherein said measuring means is arranged to represent in numeral the usable time of said battery so as to be displayed on said display means.

12. An electric apparatus according to claim 11, wherein said memory stores a plurality of sets of data each being represented in numeral to be displayed on said display means, each having a correspondence to the electromotive force of said battery.

13. An electric apparatus according to claim 8, wherein said measuring means is arranged to represent in length of a bar the usable time of said battery so as to be displayed on said display means.

14. An electric apparatus according to claim 13, wherein said memory stores a plurality of sets of data each being represented in length of a bar to be displayed on said display means, each having a correspondence to the electromotive force of said battery.

15. An electric apparatus having a function to charge a secondary battery, comprising:

(a) said battery for supplying the power to said apparatus;

(b) measuring means for measuring a terminal voltage of said battery at a predetermined period in the course of battery charging;

(c) display means for displaying information corresponding to a usable time of said battery in accordance with the terminal voltage of said battery; and (d) display control means having a memory stored with a plurality of sets of control data each controlling a displaying state of said display means which state corresponds to the terminal voltage of said battery, for reading out a set of control data from among said plurality of sets of control data stored in said memory in accordance with the terminal voltage of said battery measured by said measuring means and for outputting said set of control data thus read out to said display means.

16. An electric apparatus according to claim 15, wherein said secondary battery is arranged to be detachably attachable to said apparatus.

17. An electric apparatus according to claim 15, wherein said display means includes an analog/digital converter which can put the measured terminal voltage of said battery into a data form.

18. An electric apparatus according to claim 15, wherein said measuring means is arranged to represent in numeral the usable time of said battery so as to be displayed on said display means.

19. An electric apparatus according to claim 18, wherein said memory stores a plurality of sets of data each being represented in numeral to be displayed on said display means, each having a correspondence to the terminal voltage of said secondary battery.

20. An electric apparatus according to claim 15, wherein said measuring means is arranged to represent in length of a bar the usable time of said battery so as to be displayed on said display means.

21. An electric apparatus according to claim 20, wherein said memory stores a plurality of sets of data each being represented in length of a bar to be displayed on said display means, each having a correspondence to the terminal voltage of said secondary battery.

22. An electric apparatus having a function to charge a battery, comprising:

(a) said battery for supplying the power to said apparatus;

(b) measuring means for measuring an electromotive force of said battery at a predetermined period in the course of battery charging;

(c) display means for displaying information corresponding to a usable time of said battery in accordance with the electromotive force of said battery; and (d) display control means having a memory stored with a plurality of sets of control data each controlling a displaying state of said display means which state corresponds to the electromotive force of said battery, for reading out a set of control data from among said plurality of sets of control data stored in said memory in accordance with the electromotive force of said battery measured by said measuring means and for outputting said set of control data thus read out to said display means.

23. An electric apparatus according to claim 22, wherein said secondary battery is arranged to be detachably attachable to said apparatus.

24. An electric apparatus according to claim 22, wherein said display means includes an analog/digital converter which can put the measured electromotive force of said secondary battery into a data form.

25. An electric apparatus according to claim 22, wherein said measuring means is arranged to represent in numeral the usable time of said battery so as to be displayed on said display means.

26. An electric apparatus according to claim 25, wherein said memory stores a plurality of sets of data each being represented in numeral to be displayed on said display means, each having a correspondence to the electromotive force of said secondary battery.

27. An electric apparatus according to claim 22, wherein said measuring means is arranged to represent in length of a bar the usable time of said secondary battery so as to be displayed on said display means.

28. An electric apparatus according to claim 27, wherein said memory stores a plurality of sets of data each being represented in length of a bar to be displayed on said display means, each having a correspondence to the electromotive force of said secondary battery.

* * * * *

UNITED STATES PATENT AND TRADEMARK OFFICE
CERTIFICATE OF CORRECTION

PATENT NO. : 5,861,732
DATED : Jan. 19, 1999
INVENTOR(S) : Hiroyuki Takimoto, et al.

It is certified that error appears in the above-indentified patent and that said Letters Patent is hereby corrected as shown below:

Title page, item [54] and Column 1:
Title page, Item [57], Abstract, lines 2, 5, and 7, delete "interterminal" and insert -- terminal --.
   Col. 3, line 8, delete "circulation" and insert -- calculation --.
   Col. 6, lines 8, 11, and 37, delete "interterminal" and insert -- terminal --.
   Col. 6, line 17, delete "form" and insert -- from --.
   Col. 6, line 26, delete "When" and insert -- when --.
   Col. 7, line 38, delete "leas" and insert -- lead --.
   Col. 8, line 17, delete "interterminal" and insert -- terminal --.
   Col. 10, lines 30 and 31, delete "interterminal" and insert -- terminal --.

Signed and Sealed this

Sixteenth Day of November, 1999

Attest:

Q. TODD DICKINSON

*Attesting Officer*    Acting Commissioner of Patents and Trademarks